United States Patent [19]

Bulleyment

[11] 4,399,370
[45] Aug. 16, 1983

[54] NOISE REDUCTION METHOD AND APPARATUS

[75] Inventor: Keith J. Bulleyment, North Oaks, Minn.

[73] Assignee: Honeywell Inc., Minneapolis, Minn.

[21] Appl. No.: 339,966

[22] Filed: Jan. 18, 1982

[51] Int. Cl.³ ............................................. H02B 1/24
[52] U.S. Cl. .................................... 307/112; 361/159
[58] Field of Search ...................... 307/96, 112, 132 R, 307/132 E; 361/152, 159, 168, 169, 191, 195

[56] References Cited

U.S. PATENT DOCUMENTS 3,832,599  8/1974  Grundy ........................... 361/195 X
4,318,155  3/1982  Thomas .......................... 361/159 X
4,335,418  6/1982  Clement ...................... 307/132 E X Primary Examiner—L. T. Hix
Assistant Examiner—D. Jennings
Attorney, Agent, or Firm—George W. Field

[57] ABSTRACT

Apparatus for reducing noise due to switching transients in a control system having a plurality of inverting amplifiers located at a common site to receive individual switching input signals, a like plurality of relays located remotely from the amplifiers for individual energization and deenergization thereby in accordance with the switching signals, and conductors connecting the relays severally to the amplifiers, the apparatus comprising series circuits associated severally with the amplifiers, each series circuit including a resistor and a capacitor, having first terminals interconnected at a junction point and second, independent terminals, the inputs of the amplifiers being connected severally to the junction points, the input signals being connected severally to the independent terminals of the resistors, and the outputs of the amplifiers being connected severally to the independent terminals of the capacitors.

8 Claims, 2 Drawing Figures

NOISE REDUCTION METHOD AND APPARATUS

TECHNICAL FIELD

This invention relates to the field of electrical engineering, and particularly to electrical systems for controlling the performance of plural measuring and control functions, including the energization of a plurality of relays, from a single location which may be remote from the relay windings.

BACKGROUND OF THE INVENTION

There are many applications in which a centralized supervisory arrangement of amplifiers controls the performance of sensing, measuring, and controlling functions of remote site. Interconnecting leads between the remote site and the supervisory arrangement are necessary, and may be as much as twelve feet long. A very convenient form of interconnection is known as ribbon cable, in which many mutually insulated conductors extend side by side in a tape or ribbon.

It will be appreciated that the rapid rise and fall of current with accompanies relay energization and de-energization unavoidably produces electrical noise in adjacent conductors: this noise may interfere with or even entirely compromise measurement signals in the adjacent conductors, or even in conductors entirely remote from the noise producing conductor.

BRIEF SUMMARY OF THE INVENTION

I have discovered that the undesirable noise created by relay switching circuits can be greatly lessened if the rate of change of voltage between relay control conductors and the rate of change of current in common paths, such as ground, can be reduced. The present invention comprises circuitry readily and inexpensively attachable to the amplifiers or drivers of a centeral supervisory arrangement, which functions to reduce the rate of current change without interfering with the reliability and sensitivity of the relay operation.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views.

DESCRIPTION OF THE PREFERRED EMBODIMENT

Figure 1:
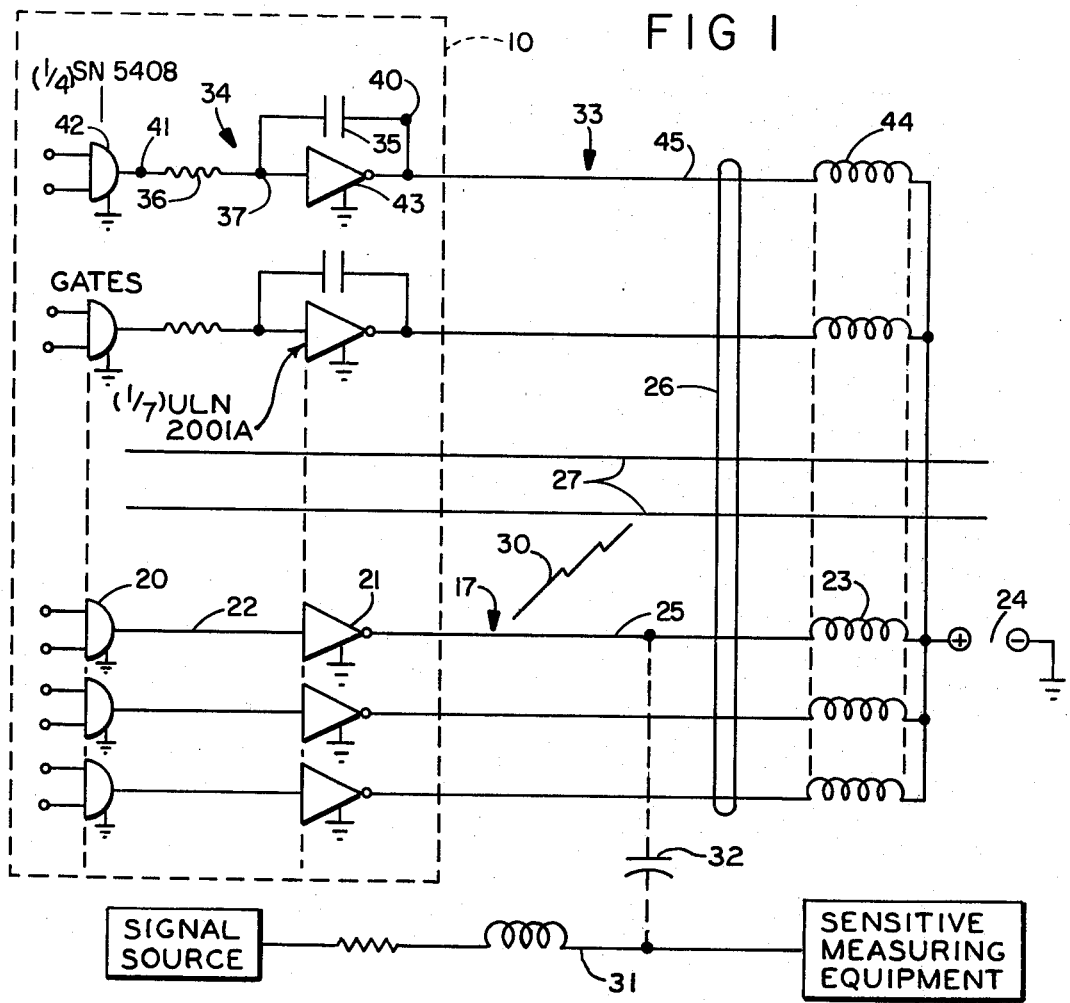
FIG. 1 is a schematic diagram of a control system embodying the invention.

Referring first to FIG. 1, a control system is shown to comprise a central supervisory apparatus 10 for controlling the operation of a number of relays located remotely therefrom. A typical channel 17 of such a system includes a gate 20 actuated by conventional means not shown to energize a relay driver 21 through a connection 22 and the usual ground return. A relay winding 23 located remotely is energized by driver 21 from a source 24 through an elongated conductor 25 and the usual ground return, the latter being common to a plurality of relays and drivers as is customary in such systems. Conductor 25 is one of the wires in a ribbon cable suggested at 26, other conductors 27 of which may be carrying signals to apparatus 10 from remote sensing or measuring circuits. As suggested at 30, switching transients in channel 17, for example, may act through inductive, capacitive, or common current coupling to cause noise in conductors 27. As a matter of fact, if the rate of change of voltage or current accompanying switching is sufficiently large, severe noise interference may develop in a high impedance conductor such as conductor 31 which is not even a part of ribbon conductor 26, and may be fairly remote therefrom, the coupling taking place through the stray capacitance 32 between conductors.

The two upper channels of FIG. 1 have been modified in accordance with the invention. Thus, in channel 33 there is shown a series circuit 34 comprising a capacitor 35 and a resistor 36 having first terminals connected at a junction point 37, and independent terminals 40 and 41. The channel comprises a gate 42, an inverting driver 43, preferably with a voltage gain of twenty or more, and a relay 44 connected to source 24 through the common ground and through an elongated conductor 45. The input, from gate 42 is connected to independent terminal 41 of resistor 36, the output from driver 43 is connected to independent terminal 40 of capacitor 35, and junction point 37 is connected to driver input.

Figure 2:
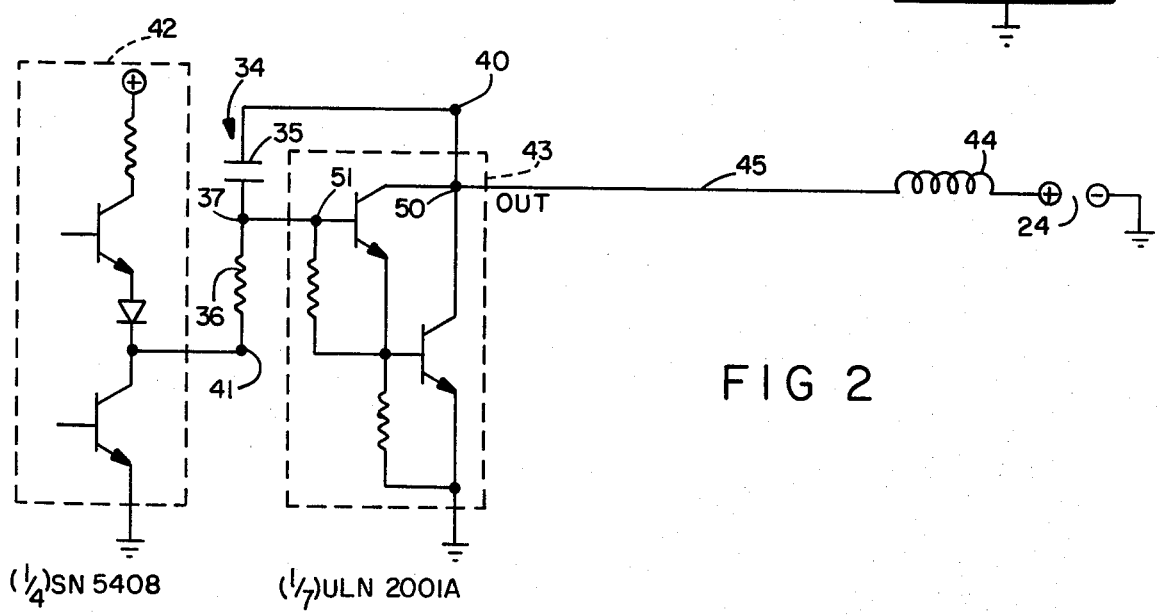
FIG. 2 is a wiring diagram of a portion of a preferred embodiment of the invention.

For completeness of disclosure a fragmentary detailed wiring diagram is shown in FIG. 2. Driver 43 is shown to comprise one channel of an ULN2001A, which comprises a Darlington pair having an output terminal 50 and an input base terminal 51. Gate 42 is one channel of an SN5408. Series circuit 34 comprises capacitor 35 and resistor 36, having junction point 37. Terminal 40 of capacitor 35 is connected to output terminal 50, terminal 41 of resistor 36 is connected to gate 42, and junction point 37 is connected to base terminal 51.

It will be evident that the relay driver operates as a linear amplifier, during positive and negative transitions of the voltage at terminal 50. The desired rate of change of output voltage is controlled by the input current, that is, the current through resistor 36, and the feedback capacitance of capacitor 35.

In one embodiment of the invention resistor 36 was 1,000 ohms and capacitor 35 was 0.1 microfarad. The current rise time on relay turn-on was increased from 50 nanoseconds to 0.8 milliseconds, and the current fall time on relay turn-off was increased from 230 nanoseconds to 1.2 milliseconds. The noise reduction ratio at turn-on was 16,000, and at turn-off was 5200.

From the foregoing it will be evident that the invention comprises a method and means for reducing noise due to switching transients by use of a series resistance-capacitance circuit having a common terminal connected to a relay driver input, the independent capacitor terminal being connected to the driver output and the independent resistor terminal receiving the input signal for the driver.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. Means for reducing noise due to switching transients in a control system having a plurality of inverting amplifiers located at a common site to receive individual switching input signals, a like plurality of relays located remotely from said amplifiers for individual energization and de-energization thereby in accordance with said switching signals, and conductors connecting said relays severally to said amplifiers, said means comprising series circuits associated severally with said amplifiers, each said circuit including a resistor and a capacitor having first terminals interconnected at a junction point and second, independent terminals, means connecting the inputs of said amplifiers severally to said junction points, means connecting the input signals severally to said independent terminals of said resistors, and means connecting the outputs of said amplifiers severally to said independent terminals of said capacitors.

2. Apparatus according to claim 1 in which the values of said capacitor and said resistor are chosen to reduce the rate of change of current in said conductors by a factor of between 10 and 100.

3. A control system having a plurality of inverting amplifiers located at a common site to receive individual switching input signals, a like plurality of relays located remotely from said amplifiers for individual energization and de-energization thereby in accordance with said switching signals, conductors connecting to said relays severally to said amplifiers, series circuits associated severally with said amplifiers, each said circuit including a resistor and a capacitor having first terminals interconnected at a junction point and second, independent terminals, means connecting the inputs of said amplifiers severally to said junction points, means connecting the input signals severally to said independent terminals of said resistors, and means connecting the outputs of said amplifiers severally to said independent terminals of said capacitors.

4. A system according to claim 3 in which said conductors extend generally parallel and are closely spaced for a major portion of their length.

5. A system according to claim 3 in which said conductors are wires of a ribbon cable.

6. A system according to claim 3 in which said relays are connected to a common source remote from said amplifiers, and a common return connects said source to said amplifiers.

7. A system according to claim 3 in which said amplifier comprise Darlington pairs and said junction points are connected to the input bases of said pairs.

8. A system according to claim 3 in which said amplifiers comprise transistors and said junction points are connected to the bases of said transistors.

* * * * *